US009428015B2

(12) United States Patent
Kitagawa et al.

(10) Patent No.: US 9,428,015 B2
(45) Date of Patent: Aug. 30, 2016

(54) TIRE IDENTIFICATION CODE REGISTRATION SYSTEM

(71) Applicant: KABUSHIKI KAISHA TOKAI RIKA DENKI SEISAKUSHO, Aichi (JP)

(72) Inventors: Kei Kitagawa, Aichi (JP); Katsuhide Kumagai, Aichi (JP); Yasuhiro Shibata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 82 days.

(21) Appl. No.: 14/483,533

(22) Filed: Sep. 11, 2014

(65) Prior Publication Data

US 2015/0077238 A1    Mar. 19, 2015

(30) Foreign Application Priority Data

Sep. 19, 2013  (JP) .................................. 2013-194217

(51) Int. Cl.
| | | |
|---|---|---|
| *B60C 23/00* | (2006.01) | |
| *B60C 23/04* | (2006.01) | |
| *B60C 23/02* | (2006.01) | |
| *G08B 21/00* | (2006.01) | |

(52) U.S. Cl.
CPC .................................. *B60C 23/0415* (2013.01)

(58) Field of Classification Search
CPC ....................... B60C 23/0408; B60C 23/0479; B60C 23/0433; B60C 23/0416; B60C 23/0462
USPC .................... 340/447, 442, 444, 807.16, 445
See application file for complete search history.

(56) References Cited

U.S. PATENT DOCUMENTS

| | | | |
|---|---|---|---|
| 5,612,671 A | 3/1997 | Mendez et al. | |
| 2004/0044450 A1* | 3/2004 | Taguchi | B60C 23/0466 701/29.6 |
| 2005/0017860 A1 | 1/2005 | Tsuji et al. | |
| 2005/0033485 A1* | 2/2005 | Nimmo | B60C 23/0416 701/1 |
| 2010/0302063 A1* | 12/2010 | Isomura | B60C 23/0415 340/870.16 |
| 2012/0203425 A1 | 8/2012 | Shibagaki | |
| 2013/0054079 A1 | 2/2013 | Shibata et al. | |
| 2014/0354421 A1 | 12/2014 | Kosugi et al. | |

FOREIGN PATENT DOCUMENTS

| | | |
|---|---|---|
| DE | 10333790 | 2/2004 |
| JP | 9-210827 | 8/1997 |
| JP | 2012-236527 | 12/2012 |
| WO | 03/086788 | 10/2003 |

\* cited by examiner

*Primary Examiner* — Jack K Wang (74) *Attorney, Agent, or Firm* — Greenblum & Bernstein, P.L.C.

(57) ABSTRACT

A tire identification code registration system for use with tire pressure detectors and a tire pressure monitoring system (TMPS) receiver. Each tire pressure detector, which includes a unique tire identification code, is coupled to a tire to detect the pressure of the tire and transmit a tire pressure signal. The receiver receives the tire pressure signal and monitors the pressure of the tire. The tire identification code registration system includes a storage manager that stores, in a memory, tire identification codes included in wireless signals received during a predetermined storage period as candidate tire identification codes. A registration unit registers the candidate tire identification codes in the memory as formal tire identification codes after the storage performed by the storage manager when the number of the candidate tire identification codes in the memory is equal to a predetermined storage number.

14 Claims, 5 Drawing Sheets

TIRE IDENTIFICATION CODE REGISTRATION SYSTEM

CROSS-REFERENCE TO RELATED APPLICATIONS

This application is based upon and claims the benefit of priority from prior Japanese Patent Application No. 2013-194217, filed on Sep. 19, 2013, the entire contents of which are incorporated herein by reference.

BACKGROUND

The present invention relates to a tire identification code registration system.

A typical tire pressure monitoring system, which includes a transmitter that transmits a tire pressure signal and a receiver that receives the tire pressure signal, is configured so that the receiver monitors the air pressure of a tire based on the tire pressure signal. Various methods have been proposed to register a tire identification code to the receiver without using a dedicated registration tool other than the transmitter and the receiver.

For example, Japanese Laid-Open Patent Publication No. 9-210827 describes a method for registering four tire identification codes initially received by a receiver as the tire identification codes of the corresponding vehicle. Japanese Laid-Open Patent Publication No. 2012-236527 describes a system including a receiver and a tire pressure detector, which is configured to include a sudden pressure decrease bit in a tire pressure signal when the a sudden tire pressure decrease is carried out. In a registration mode, the receiver receives tire identification codes and registers the tire identification code that includes the sudden pressure decrease bit as the tire identification code of the corresponding vehicle.

In the technique of the '827 publication, when another vehicle is located near the corresponding vehicle during registration of the tire identification code, the receiver may receive a tire identification code of the other vehicle before receiving the tire identification code of the corresponding vehicle. This may result in erroneous registration of the tire identification code. In the technique of the '527 publication, there is a need to carry out a sudden tire pressure decrease during ID registration. This increases the burden on the person performing the registration.

SUMMARY

It is an object of the present invention to provide a tire identification code registration system that can reduce or obviate erroneous registration.

One aspect of the present invention is a tire identification code registration system for use with a plurality of tire pressure detectors and a tire pressure monitoring system (TPMS) receiver. Each of the tire pressure detectors includes a unique tire identification code and is configured to be coupled to a tire. Each of the tire pressure detectors is configured to detect pressure of the corresponding tire and transmit a tire pressure signal that includes tire pressure information. The receiver is configured to receive the tire pressure signal and monitor the pressure of the corresponding tire based on the received tire pressure signal. The tire identification code registration system includes a storage manager configured to store, in a memory, tire identification codes included in wireless signals received during a predetermined storage period as candidate tire identification codes. A registration unit is is configured to register the candidate tire identification codes in the memory as formal tire identification codes after the storage performed by the storage manager when the number of the candidate tire identification codes in the memory is equal to a predetermined storage number.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

A first embodiment of a tire identification code registration system will now be described with reference to the drawings.

Figure 1:
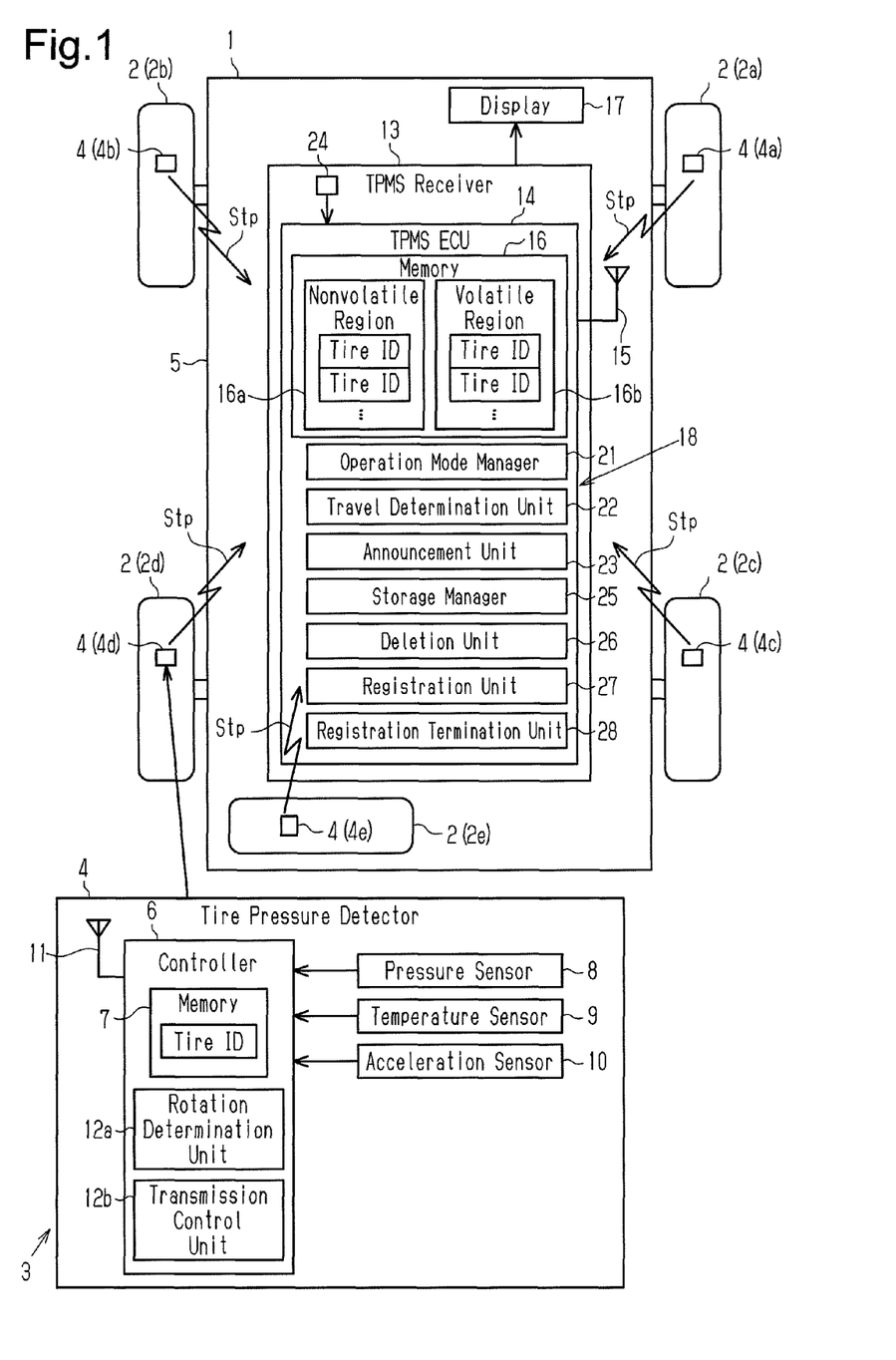
FIG. 1 is a block diagram of a tire identification code registration system in a first embodiment.

Referring to FIG. 1, a vehicle 1 includes a tire pressure monitoring system (TPMS) 3 that monitors the tire pressure and the like of tires 2a to 2e. The tire pressure monitoring system 3 of the first embodiment includes transmitters, or tire pressure detectors 4 (4a to 4e), and a receiver 13. The tire pressure detectors 4a to 4e are respectively arranged in the tires 2a to 2e. The receiver 13 is capable of performing wireless communication with the tire pressure detectors 4a to 4e. Each tire pressure detector 4 may be integrated with a tire valve. Each of the tire pressure detectors 4a to 4e detects the tire pressure and transmits a tire pressure signal Stp, which includes tire pressure information. In the illustrated example, the vehicle 1 travels on the tires 2a to 2d and stores the tire 2e as a spare tire.

Each of the tire pressure detectors 4a to 4e is provided with a controller 6 that includes a memory 7, a rotation determination unit 12a, and a transmission control unit 12b. The memory 7 of the controller 6 stores a unique tire identification code (valve identification code). The tire identification code may be referred to as the tire ID. In the illustrated example, the controller 6 is connected to a pressure sensor 8, which detects the tire pressure, a temperature sensor 9, which detects the tire temperature, and an acceleration sensor 10, which detects rotation of the corresponding tire 2. The controller 6 is connected to a transmission antenna 11, which is capable of transmitting radio waves on the ultrahigh frequency (UHF) band.

Each tire pressure detector 4 periodically transmits a tire pressure signal Stp in controlled cycles. The tire pressure detectors 4a to 4e may transmit the tire pressure signal Stp in the same cycle or in different cycles. In one example, the tire pressure detectors 4a to 4e transmit the tire pressure signal Stp at different timings that are randomly set so that transmissions of the tire pressure signal Stp from the tire pressure detectors 4a to 4e do not overlap with one another. In several examples, each tire pressure detector 4 transmits the tire pressure signal Stp further frequently when detecting rotation of the corresponding tire 2 that exceeds a rotation reference value. When rotation of the corresponding tire 2 does not exceed the rotation reference value, the tire pressure detector 4 transmits the tire pressure signal Stp less frequently in longer intervals.

The rotation determination unit 12a of the controller 6 determines whether or not the corresponding tire is rotating based on, for example, a detection signal of the acceleration sensor 10. The transmission control unit 12b switches or changes the transmission cycle of the tire pressure signal Stp in accordance with the determination of the rotation determination unit 12a. In the preferred example, the rotation determination unit 12a includes a rotation determination reference value. When the acceleration detected by the acceleration sensor 10 is less than or equal to the rotation determination reference value, the rotation determination unit 12a determines that the tire 2 is not rotating. When the detected acceleration by the acceleration sensor 10 is greater than the rotation determination reference value, the rotation determination unit 12a determines that the tire 2 is rotating. Preferably, the rotation determination reference value is set to ensure accurate determination of rotation of the tire 2. Further, the rotation determination reference value may be set as a value that is greater than zero, taking into consideration the detection accuracy of the acceleration sensor. When the rotation determination unit 12a determines that the tire 2 is rotating, the transmission control unit 12b controls the transmission cycle so that the tire pressure signal Stp is transmitted in first time intervals (e.g., one minute intervals). When the rotation determination unit 12a determines that the tire 2 is not rotating, the transmission control unit 12b controls the transmission cycle so that the tire pressure signal Stp is transmitted in second time intervals (e.g., two minute intervals), which are longer than the first time intervals.

Each tire pressure detector 4 transmits a tire pressure signal Stp that includes a plurality of frames when the corresponding tire 2 is rotating and transmits a tire pressure signal Stp that includes only a single frame when the tire 2 is not rotating. Each frame includes a tire ID and tire pressure information regardless of rotation of the tire 2.

The TPMS receiver 13 may be installed on a vehicle body 5. The receiver 13 is configured to receive the tire pressure signals Stp from the tire pressure detectors 4a to 4e and monitor the tire pressure of each of the tires 2a to 2e. The receiver 13 includes a tire pressure monitoring system electronic control unit (TPMS ECU) 14 and a reception antenna 15, which is capable of receiving radio waves on the UHF band. The TPMS ECU 14 is provided with a memory 16, which may include a nonvolatile region 16a and a volatile region 16b. Once tire ID registration is completed, the tire IDs of the tires 2a to 2e are stored (registered) in the nonvolatile region 16a in a nonvolatile manner. The tire IDs are temporarily held in the volatile region 16b during the tire ID registration. In several examples, the nonvolatile region 16a and the volatile region 16b may be a nonvolatile memory element and a volatile memory element. The term "tire ID registration" may refer to the nonvolatile storage of the tire IDs. The receiver 13 may be connected to a display 17 set on, for example, an instrument panel in the vehicle 1.

When the receiver 13 receives the tire pressure signal Stp from each of the tire pressure detectors 4a to 4e, the receiver 13 verifies the tire ID in the tire pressure signal Stp with the tire ID registered to the nonvolatile region 16a of the memory 16. When the tire ID is verified, the receiver 13 checks the tire pressure information that is included in the tire pressure signal Stp. When the measured pressure in the tire pressure information is less than or equal to a low pressure determination reference value, the receiver 13 indicates a tire pressure warning on the display 17. The receiver 13 may check the tire pressure whenever receiving the tire pressure signal Stp.

Tire ID Registration

The tire pressure monitoring system 3 includes a tire ID registration system 18 that registers the tire IDs of the tires 2a to 2e to the receiver 13. In the first embodiment, the tire ID registration system 18 temporarily stores the tire ID included in a tire pressure signal received during a predetermined storage period TM as a candidate tire ID in the memory 16. After the predetermined storage period TM ends, when the number of candidate tire IDs in the memory 16 is equal to a predetermined storage number, the tire ID registration system 18 registers the candidate IDs in the memory 16 as formal tire IDs, or IDs of the corresponding vehicle. The number of candidate tire IDs indicates the number of different unique tire IDs. For example, when the same unique tire ID is received a number of times during the predetermined storage period TM, the unique tire ID is stored as a single candidate tire ID in the memory 16. The predetermined storage number may be, for example, the number of tires 2 of the vehicle 1. In the first embodiment, the storage number may be five (2a to 2e) including the spare tire 2e.

In one example, the TPMS ECU 14 includes an operation mode manager 21, which switches operation modes (e.g., normal mode and registration mode) of the receiver 13, a travel determination unit 22, which determines whether or not the vehicle 1 is travelling, and an announcement unit 23, which announces the ID registration status through the display 17. In the illustrated example, the TPMS ECU 14 is connected to an input device such as a mode switching button 24. When manually operated, the mode switching button 24 outputs a mode switching request to switch the mode of the receiver 13.

In one example, the operation mode manager 21 switches the receiver 13 between a pressure monitoring mode and a registration mode in accordance with a mode switching request from an input device such as the mode switching button 24. In the pressure monitoring mode, the receiver 13 monitors the tire pressure based on the tire pressure signal Stp transmitted from each tire pressure detector 4. In the registration mode, the receiver 13 registers tire IDs as will be described later. The travel determination unit 22 obtains, for example, a detected vehicle speed (speed information) from a meter ECU, a vehicle speed sensor, or the like. When the detected vehicle speed is greater than or equal to a travel determination reference value, the receiver 13 determines that the vehicle 1 is travelling. When the detected vehicle speed is less than the travel determination reference value, the receiver 13 determines that the vehicle 1 is not travelling.

Taking into consideration the accuracy of the detected vehicle speed, the travel determination reference value may be, for example, approximately 5 to 30 km/h. When the receiver 13 switches to the registration mode, the announcement unit 23 shows a sign on the display 17 to announce that the receiver 13 is in the registration mode. After the ID registration is completed, the announcement unit 23 eliminates the sign from the display 17. When the registration mode is terminated but the ID registration is incomplete, the announcement unit 23 shows a sign on the display 17 to announce that ID registration has not been completed. This allows the tire ID registration system 18 to present the tire ID registration status.

The TPMS ECU 14 includes a storage manager 25, which temporarily stores tire IDs in the volatile region 16b of the memory 16, a deletion unit 26, which deletes tire IDs from the volatile region 16b, and a registration unit 27, which registers the candidate tire IDs in the volatile region 16b as formal tire IDs.

In several examples, if the travel determination unit 22 determines that the vehicle 1 is travelling when the receiver 13 is in the registration mode, the storage manager 25 stores, in the volatile region 16b of the memory 16, only tire IDs that are included in wireless signals (e.g., tire pressure signal Stp) received during the predetermined storage period TM (storage process). The storage manager 25 does not store, in the memory 16, the tire ID included in a tire pressure signal Stp received when the vehicle is not travelling. Each tire ID stored in the volatile region 16b may be referred to as a candidate tire ID. The storage manager 25 does not store, in the memory 16, the tire ID included in a tire pressure signal Stp received during a predetermined deletion period TD.

In several examples, if the storage manager 25 determines that the vehicle 1 is not travelling before the predetermined storage period TM ends from when determining that the receiver 13 is in the registration mode while the vehicle 1 is travelling, the storage manager 25 temporarily stops measuring time. When determining that the vehicle 1 is travelling again, the storage manager 25 resumes the time measurement. For example, even when the vehicle 1 stops during the predetermined storage period TM, the storage manager 25 ends the storage process if the total time period during which the vehicle 1 is travelling exceeds the predetermined storage period TM. Further, the predetermined storage period TM is set to have a duration allowing the tire pressure signal Stp to be transmitted a number of times from a tire pressure detector 4 even when the tire pressure detector 4 transmits the tire pressure signal Stp in time intervals corresponding to the second time interval (time interval when tire is not rotating).

When the number of candidate tire IDs in the volatile region 16b is greater than the predetermined storage number, the deletion unit 26 is configured to delete the candidate tire IDs in accordance with a deletion condition. In a preferred example, when the number of candidate tire IDs in the volatile region 16b is greater than the predetermined storage number, the deletion unit 26 deletes each tire ID that is not included in a tire pressure signal Stp received when the travel determination unit 22 determines that the vehicle 1 is travelling while the receiver 13 is in the registration mode during the predetermined deletion period TD (deletion process). In other words, among the candidate tire IDs in the volatile region 16b, the deletion unit 26 deletes only the tire IDs that are not included in tire pressure signals received when the vehicle 1 is travelling. After performing the deletion process once, if the number of tire IDs remaining in the volatile region 16b of the memory 16 is still greater than the predetermined storage number, the deletion unit 26 repeats the deletion process.

In several examples, in the same manner as the storage manager 25, if the deletion unit 26 determines that the vehicle 1 is not travelling before the predetermined deletion period TD ends from when determining that the receiver 13 is in the registration mode while the vehicle 1 is travelling, the storage manager 25 temporarily stops measuring time. Then, when determining that the vehicle 1 is travelling again, the storage manager 25 resumes the time measurement. For example, even when the vehicle 1 stops during the predetermined deletion period TD, the storage manager 25 ends the deletion process if the total time period during which the vehicle 1 is travelling exceeds the predetermined deletion period TD. Further, in the same manner as the predetermined storage period TM, the predetermined deletion period TD is set to have a duration allowing the tire pressure signal Stp to be transmitted a number of times from a tire pressure detector 4 even when the tire pressure detector 4 transmits the tire pressure signal Stp in time intervals corresponding to the second time interval. The predetermined storage period TM and the predetermined deletion period TD may have the same length or different lengths.

The TPMS ECU 14 includes a registration termination unit 28 that switches the operation mode of the receiver 13 to a non-registration mode to terminate the registration mode even when the registration process performed by the registration unit 27 is incomplete. For example, when the number of candidate tire IDs in the volatile region 16b of the memory 16 continues to be unequal to the predetermined storage number over a predetermined registration period or longer, the operation mode of the receiver 13 is switched to the non-registration mode. The predetermined registration period has a duration including the predetermined storage period TM and a predetermined number of the predetermined deletion periods TD. Further, after the storage process is performed or the deletion process is performed, when the number of candidate tire IDs in the volatile region 16b of the memory 16 becomes less than the predetermined storage number, the registration termination unit 28 switches the operation mode of the receiver 13 to the non-registration mode. If the receiver 13 is switched to the non-registration mode when the registration unit 27 has not completed the registration process, the tire IDs obtained before switching from the registration mode remains registered to the receiver 13.

The tire ID registration performed by the tire ID registration system 18 of the present embodiment will now be described. In the description hereafter, the tire IDs of the corresponding vehicle 1 will be referred to as "ID1" to "ID5", and the tire IDs of other vehicles will be referred to as "ID6" to "ID20".

When registering tire IDs to the receiver 13, the person performing the registration, namely, the registrant, first switches the receiver 13 to the registration mode by operating the mode switching button 24 and then drives the vehicle 1.

Figure 2:
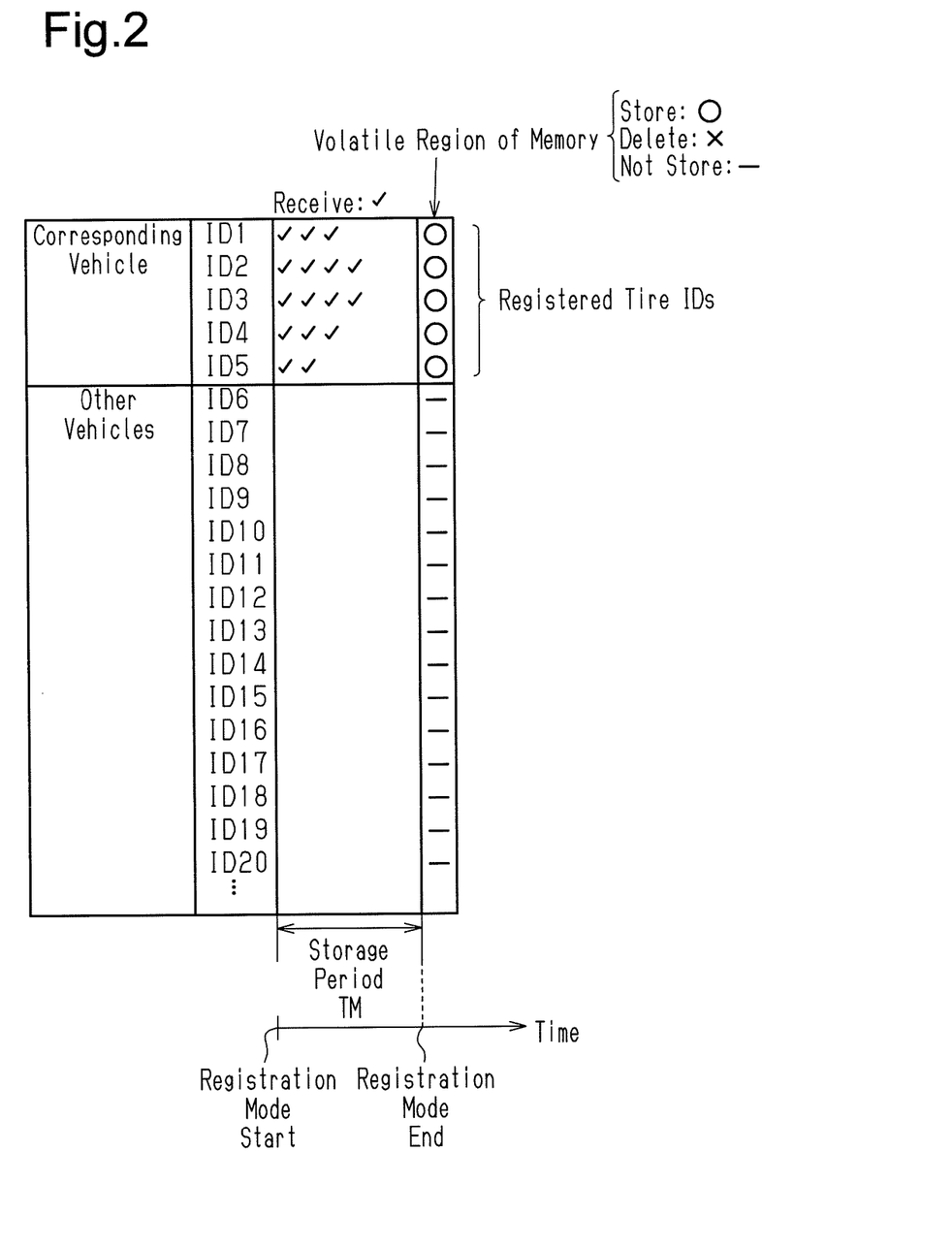
FIG. 2 is a schematic diagram illustrating the reception of tire identification codes during a storage period and the storage of tire identification codes to the memory.

FIG. 2 illustrates a typical example when another vehicle is not located near the receiver 13. In this example, during the predetermined storage period TM, the receiver 13 receives "ID1" three times, "ID2" and "ID3" four times, "ID4" three times, and "ID5" two times but does not receive "ID6" to "ID20" of the other vehicles. In this case, the storage manager 25 stores "ID1" to "ID5" as candidate tire IDs in the memory 16. Since the number candidate tire IDs is the same as the predetermined storage number (five), the deletion unit 26 does not perform the deletion process, and the registration unit 27 registers "ID1" to "ID5" as the formal tire IDs of the corresponding vehicle 1 to the receiver 13. After the registration is completed, the operation mode manager 21 switches the operation mode of the receiver 13 to the non-registration mode.

Figure 3:
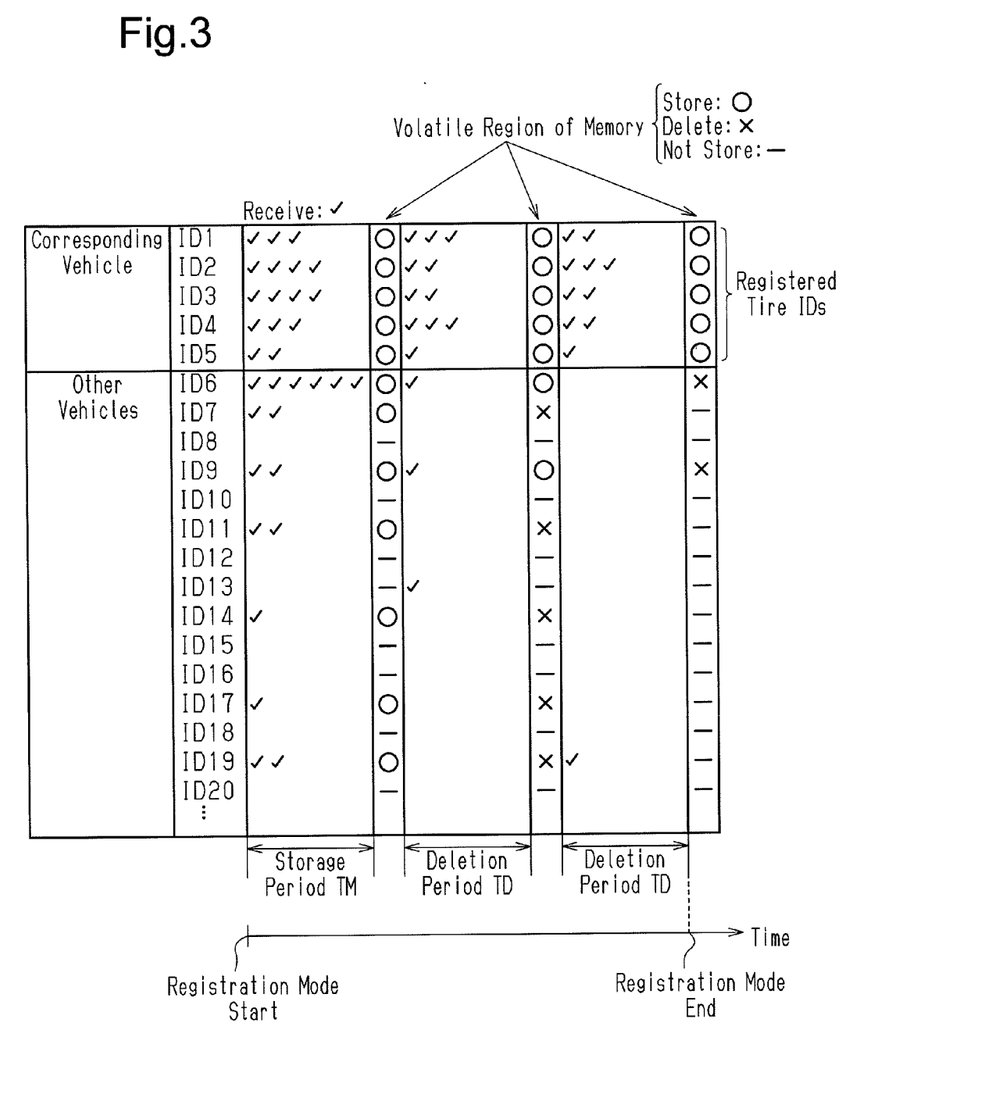
FIG. 3 is a schematic diagram illustrating the reception of tire identification codes in a storage period and a deletion period, the storage of tire identification codes to the memory, and the deletion of tire identification codes in the tire identification code registration system of the first embodiment.

FIG. 3 illustrates a typical example when one or more other vehicles are located near the receiver 13. In this example, during the predetermined storage period TM, the receiver 13 receives "ID1" to "ID5" in the same manner as in FIG. 2 and further receives "ID6" six times, each of "ID7", "ID9", and "ID11" two times, each of "ID14" and "ID17" once, and "ID19" twice. In this case, the storage manager 25 stores "ID1" to "ID7", "ID9", "ID11", "ID14", "ID17", and "ID19" as candidate tire IDs in the memory 16. The number of candidate tire IDs stored in the volatile region 16b of the memory 16 is twelve and greater than the predetermined storage number (five). Thus, the deletion process is performed next.

In the example illustrated in FIG. 3, after the predetermined storage period TM and during the predetermined deletion period TD, the receiver 13 receives "ID1" three times, "ID2" and "ID3" twice, "ID4" three times, and each of "ID5", "ID6", "ID9", and "ID13" once. In this case, the deletion unit 26 does not receive "ID7", "ID11", "ID14", "ID17", and "ID19" during the predetermined deletion period TD and deletes these IDs from the candidate tire IDs in the volatile region 16b of the memory 16. In the illustrated example, the tire IDs received during the predetermined deletion period TD includes "ID13", which is not included in the candidate tire IDs stored in the volatile region 16b of the memory 16. The storage manager 25 stores only the tire IDs received during the predetermined storage period TM. Thus, the storage manager 25 does not store "ID13" in the volatile region 16b. The number of candidate tire IDs in the memory 16 when the first deletion process ends is seven and greater than the predetermined storage number. Thus, the deletion unit 26 repeats the deletion process.

In the example illustrated in FIG. 3, in the second predetermined deletion period TD, the receiver 13 receives "ID1" twice, "ID2" three times, "ID3" and "ID4" twice, and "ID5" and "ID19" once. In this case, the deletion unit 26 does not receive "ID6" and "ID9" during the second predetermined deletion period TD and deletes these IDs from the candidate tire IDs in the volatile region 16b of the memory 16. In the example of FIG. 3, the tire IDs received during the second predetermined deletion period TD includes "ID19", which is not included in the candidate tire IDs stored in the volatile region 16b of the memory 16. The storage manager 25 stores only the tire IDs received during the predetermined storage period TM. Thus, the storage manager 25 does not store "ID19" in the memory 16. The number of candidate tire IDs in the memory 16 when the second deletion process ends is five and equal to the predetermined storage number of five. Thus, the registration unit 27 performs the registration process and registers "ID1" to "ID5" as the formal tire IDs of the corresponding vehicle 1. After the registration is completed, the operation mode manager 21 switches the operation mode of the receiver 13 to the non-registration mode.

In several examples, if the number of the candidate tire IDs in the memory 16 continuously remains greater than the predetermined storage number over the predetermined registration period or longer, the operation mode manager 21 switches the operation mode of the receiver 13 to the non-registration mode without completing the registration process. Further, when the number of candidate tire IDs in the memory 16 after the storage process or the deletion process becomes less than the predetermined storage number, the operation mode manager 21 switches the operation mode of the receiver 13 to the non-registration mode without completing the registration process.

The advantages of the first embodiment will now be described.

(1) The storage manager 25 stores the tire ID included in each tire pressure signal Stp received during the predetermined storage period TM as a candidate tire identification code in the memory 16. If the number of candidate tire IDs in the memory 16 is equal to the predetermined storage number, the registration unit 27 registers the candidate tire identification codes in the memory 16 as formal tire identification codes. This configuration allows the registrant to easily register tire IDs and eliminates the need to carry out a suddenly tire pressure decrease. As long as the number of tire IDs stored in the predetermined storage period TM differs from the predetermined storage number, the storage manager 25 does not register the candidate tire identification codes in the memory 16 as the formal tire identification codes. Thus, even if tire IDs of other vehicles near the receiver 13 are first received during ID registration, erroneous registration of the tire IDs of other vehicles is obviated or reduced.

(2) The storage manager 25 stores the tire ID included in each tire pressure signal Stp received when the vehicle 1 is travelling in the volatile region 16b of the memory 16 and does not store the tire ID included in each tire pressure signal Stp received when the vehicle 1 is not travelling. During a non-travelling period, the receiver 13 may be continuously located near another vehicle over a long period. This increases opportunities in which the receiver 13 may receive the tire identification code of the other vehicle. Thus, the memory 16 does not store a tire identification code that is included in a tire pressure signal Stp received during a non-travelling period. This obviates or reduces the storage of the tire identification code of another vehicle in the memory 16.

(3) After the storage manager 25 performs the storage process, if the number of candidate tire IDs in the volatile region 16b of the memory 16 is greater than the predetermined storage number, the deletion unit 26 deletes the tire ID of each tire pressure signal Stp that is not received during the predetermined deletion period TD from the candidate tire IDs in the volatile region 16b.

Under a normal situation, a tire pressure signal Stp including a tire ID of the corresponding vehicle 1 can be received as long as, for example, the tire pressure detector 4 does not become defective. However, a tire pressure signal Stp including a tire ID of another vehicle can be received only when the other vehicle is located near the corresponding vehicle 1. Even when a tire pressure signal Stp including a tire ID of another vehicle is received during the predetermined storage period TM, there is a high probability that such a tire pressure signal Stp cannot be continuously received after the predetermined storage period TM. Thus, by deleting the tire ID that was not received during the predetermined deletion period TD from the candidate tire IDs in the memory 16, the tire ID of another vehicle may be eliminated from the candidate tire IDs. This readily decreases the number of candidate tire IDs in the volatile region 16b to the predetermined storage number and allows for selective registration of the tire IDs of the corresponding vehicle 1.

(4) The deletion unit 26 repeats the tire ID deletion until the number of candidate tire IDs in the memory 16 becomes equal to the predetermined storage number. The number of candidate tire IDs in the volatile region 16b of the memory 16 readily decreases to the predetermined storage number. This allows for selective registration of the tire IDs of the corresponding vehicle 1.

(5) The storage manager 25 does not store, in the volatile region 16b of the memory 16, the tire ID included in each tire pressure signal Stp received during the predetermined deletion period TD. After performing the storage process, new tire IDs are not stored in the volatile region 16b. The number of candidate tire IDs in the volatile region 16b of the memory 16 readily decreases to the predetermined storage number. This allows for selective registration of the tire IDs of the corresponding vehicle 1.

(6) The predetermined storage period TM and/or the predetermined deletion period TD are set to have a duration allowing the tire pressure signal Stp to be transmitted a number of times from each tire pressure detector 4. This increases the probability of the receiver 13 receiving tire pressure signals Stp including the tires ID of the corresponding vehicle 1.

(7) When a situation in which the number of candidate tire IDs in the volatile region 16b of the memory 16 is unequal to the predetermined storage number continues over the predetermined registration period or longer, the registration termination unit 28 switches the receiver 13 to the non-registration mode.

When the registration process is not completed even when a long period elapses from when the receiver 13 enters the registration mode, for example, the corresponding vehicle 1 may be located in an environment in which tire pressure signals Stp including the tire IDs of other vehicles are easily received. Thus, when a situation in which the number of candidate tire IDs in the volatile region 16b of the memory 16 is unequal to the predetermined registration period continues over a predetermined period or longer like in the configuration described above, the receiver 13 is switched to the non-registration mode when the registration process performed by the registration unit 27 is still incomplete. Further, an announcement of the incomplete ID registration is shown on the display 17. This prompts the registrant to perform the ID registration again.

(8) When the number of candidate tire IDs in the volatile region 16b of the memory 16 is less than the predetermined storage number, the registration termination unit 28 switches the receiver 13 to the non-registration mode and announces on the display 17 that ID registration is incomplete. Thus, the registrant is prompted to perform ID registration again at an early stage.

(9) The transmission control unit 12b of each tire pressure detector 4 transmits the tire pressure signal Stp further frequently when the corresponding tire 2 is rotating than when the tire 2 is not rotating. Further, when the receiver 13 is in the registration mode and the vehicle 1 is travelling, the storage manager 25 stores, in the memory 16, the tire ID included in each tire pressure signal Stp received during the predetermined storage period TM. This increases the probability of the receiver 13 receiving tire pressure signals Stp including the tires ID of the corresponding vehicle 1.

(10) When the receiver 13 is in the registration mode and the vehicle 1 is travelling, among the candidate tire IDs in the memory 16, the deletion unit 26 deletes tire IDs other than the tire IDs included in the tire pressure signals Stp received during the predetermined deletion period TD. When the vehicle 1 is travelling, the time during which another vehicle is located nearby is usually short. Thus, in the above configuration, the tire IDs of other vehicles may be readily deleted from the memory.

Second Embodiment

A second embodiment will now be described centering on differences from the first embodiment.

Figure 4:
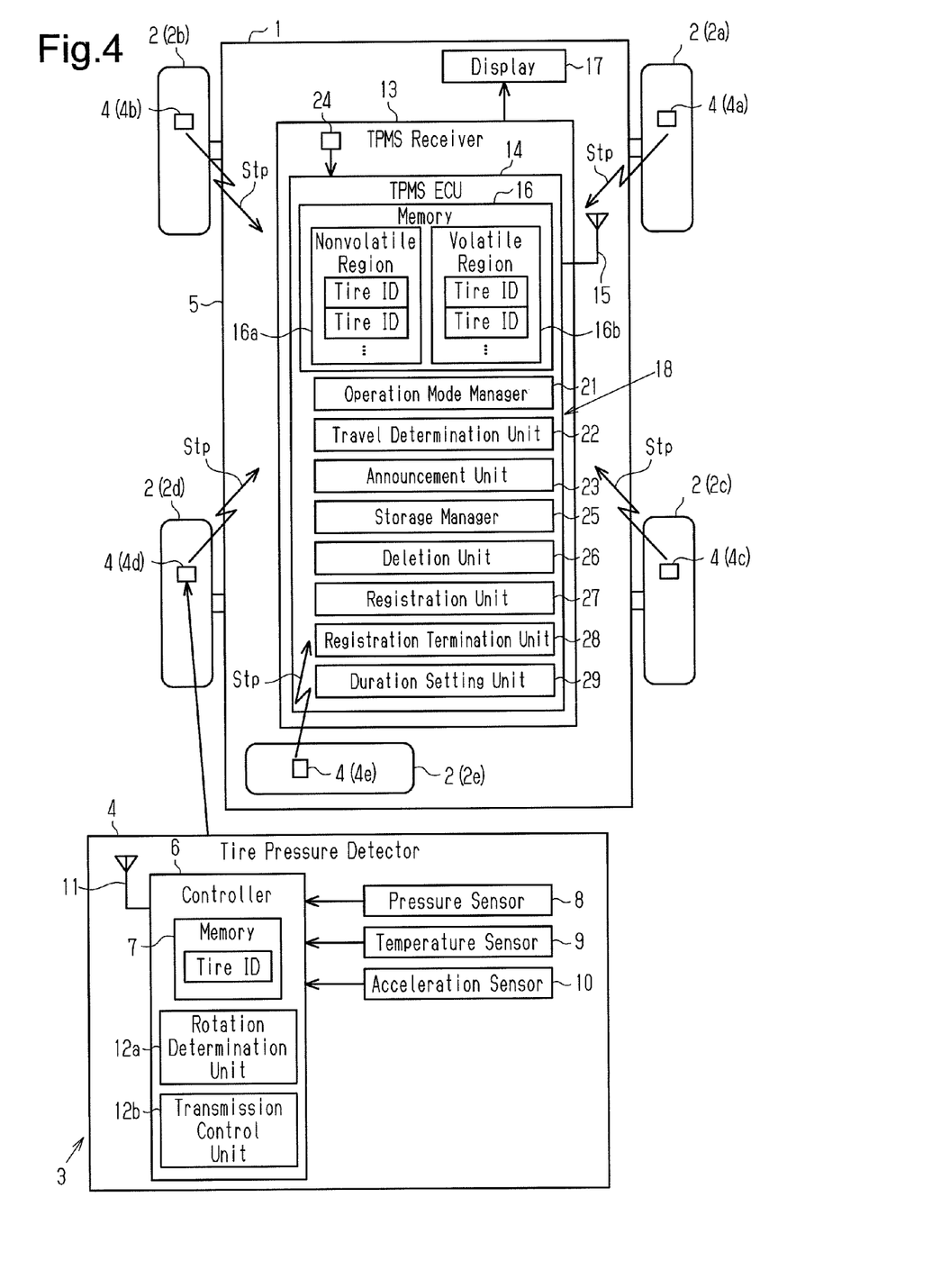
FIG. 4 is a block diagram of a tire identification code registration system in a second embodiment.

As shown in FIG. 4, the TPMS ECU 14 of the present embodiment includes a duration setting unit 29 that changes the duration of the predetermined storage period TM and the predetermined deletion period TD in accordance with the time interval in which each tire pressure detector 4 transmits the tire pressure signal Stp. For example, the duration setting unit 29 sets the predetermined storage period TM and the predetermined deletion period TD to have a duration in which the tire pressure signal Stp is transmitted a number of times from each tire pressure detector 4. Further, if the travel determination unit 22 determines that the vehicle 1 is travelling, the duration setting unit 29 shortens the predetermined storage period TM and the predetermined deletion period TD as compared to when the vehicle 1 is determined as not moving.

When the receiver 13 is in the registration mode and the vehicle 1 is travelling, among the tire IDs included in the tire pressure signals Stp received during the predetermined storage period TM, the storage manager 25 of the present embodiment does not store tire IDs that are presumed as belonging to other vehicles.

Under a normal situation, more tire pressure signals Stp including the tire IDs of the corresponding vehicle 1 can be received than tire pressure signals Stp including the tire IDs of other vehicles. Taking this into consideration, the storage manager 25 may be configured to store, among the tire IDs included in the tire pressure signals Stp received during the predetermined storage period TM, the tires IDs that are often received in the volatile region 16b of the memory 16 and not store the tire IDs that are seldom received. For example, among the tire IDs included in the tire pressure signal Stp received during the predetermined storage period TM, the storage manager 25 stores, in the volatile region 16b of the memory 16, a selected number of tire IDs ranked from above in the number of times received. Further, the storage manager 25 presumes that tire IDs excluded from selected number of tire IDs are those of other vehicles 1 and does not store such tire IDs in the volatile region 16b of the memory 16. The predetermined selected number is greater than the predetermined storage number and may be, for example, ten. The number of times received may be replaced by the number of received frames.

When performing ID registration without using a registration tool, the tire pressure signal Stp transmitted from the tire pressure detector 4 of each tire of the corresponding vehicle 1 does not include trigger information (trigger bit having a high level), which would indicate that the tire pressure signal Stp has been transmitted in response to a trigger signal transmitted from a trigger transmitter (not shown) such as an initiator. Taking this into consideration, among the tire IDs included in the tire pressure signals Stp received during the predetermined storage period TM, the storage manager 25 presumes that the tire ID in each tire pressure signal Stp including a trigger bit is that of another vehicle and does not store that tire ID in the volatile region 16b of the memory 16.

The tire ID registration performed by the tire ID registration system 18 of the present embodiment will now be described. In this case, "ID11" includes a trigger bit having a high level.

Figure 5:
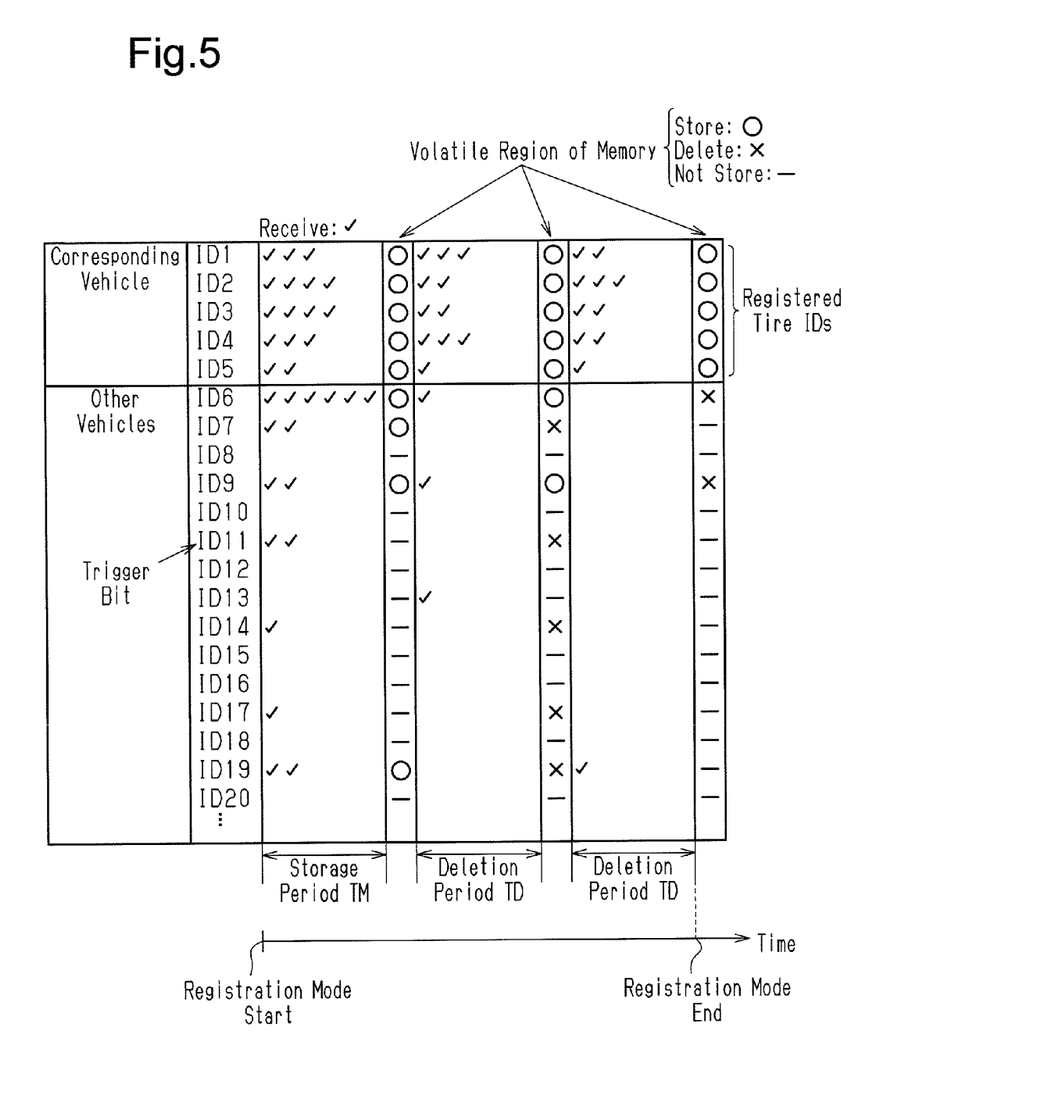
FIG. 5 is a schematic diagram illustrating the reception of tire identification codes in a storage period and a deletion period, the storage of tire identification codes to the memory, and the deletion of tire identification codes in the tire identification code registration system of the second embodiment.

In the example shown in FIG. 5, "ID1" to "ID20" are received during the predetermined storage period TM in the same manner as the example shown in FIG. 3. When taking into consideration the number of times each tire ID is received, the tires IDs included in the selected number in order from the ones often received are "ID1" to "ID7", "ID9", "ID11", and "ID19". In this case, "ID14" and "ID17" are each received only once and excluded from the selected number. The storage manager 25 stores, in the volatile region 16b of the memory 16, the tires IDs excluding "ID14" and "ID17", which are not included in the selected number, and "ID11", which includes the high-level trigger bit.

In the example shown in FIG. 5, the volatile region 16b of the memory 16 stores nine tire IDs, the number of which is greater than the predetermined storage number of five. Thus, the registration process is not performed and the deletion process is performed. When the number of candidate tire IDs in the volatile region 16b becomes equal to the predetermined storage number in the same manner as the first embodiment, the registration unit 27 performs the registration process.

In addition to advantages (1) to (10) of the first embodiment, the second embodiment has the advantages described below.

(11) The duration setting unit 29 sets the duration of the predetermined storage period TM and/or the predetermined deletion period TD to allow the tire pressure signal Stp to be transmitted a number of times from each tire pressure detector 4. Further, when determining that the vehicle 1 is travelling, the duration setting unit 29 sets the predetermined storage period TM and/or the predetermined deletion period TD to be shorter than when the vehicle is not travelling. This increases the probability of the receiver 13 receiving tire pressure signals Stp including the tires ID of the corresponding vehicle 1 and shortens the time used for ID registration.

(12) Among the tire IDs included in the tire pressure signal Stp received during the predetermined storage period TM, the storage manager 25 does not store tire IDs that are presumed to belong to other vehicles. This decreases the number of candidate tire IDs in the volatile region 16b of the memory 16 after the storage process. Thus, for example, the memory 16 may be more compact.

It should be apparent to those skilled in the art that the present invention may be embodied in many other specific forms without departing from the spirit or scope of the invention. Particularly, it should be understood that the present invention may be embodied in the following forms.

The receiver 13 or the TPMS ECU 14 in the second embodiment may be configured to presume that a tire ID belongs to another vehicle from the number of times the tire ID is received during the predetermined storage period. For example, when each tire pressure detector 4 transmits the tire pressure signal Stp in fixed cycles, there is an upper limit to the number of times the tire pressure signal Stp is transmitted during the predetermined storage period T is determined. Thus, the receiver 13 or the TPMS ECU 14 may be configured to presume that a tire ID received for a number of times that is greater than the predetermined upper limit belongs to another vehicle. Further, the receiver 13 or the TPMS ECU 14 in the second embodiment may be configured to presume that a tire ID belongs to another vehicle when the tire ID is included in a tire pressure signal Stp that is provided with a trigger bit having a high level. For example, the receiver 13 of the TPMS ECU 14 may be configured to presume that a tire ID belongs to another vehicle when the tire ID is included in a wireless signal received in cycles that differ from the fixed cycles in which each tire pressure detector 4 transmits the tire pressure signal Stp.

The receiver 13 or the TPMS ECU 14 of the first embodiment may include the duration setting unit 29 of the second embodiment.

The receiver 13 or the TPMS ECU 14 of the first embodiment may be configured not to store, among the tire IDs included in the tire pressure signals Stp received during the predetermined storage period, the tire IDs that are presumed to belong to other vehicles.

The receiver 13 or the TPMS ECU 14 in each of the above embodiments may be configured to store, in the memory 16, the tire ID included in each tire pressure signal received during the predetermined storage period TM regardless of whether or not the vehicle 1 is travelling. For example, regardless of whether or not the vehicle 1 is travelling, the receiver 13 or the TPMS ECU 14 may measure the predetermined storage period TM and/or the predetermined deletion period TD regardless of whether or not the vehicle 1 is travelling.

In each of the above embodiments, when the storage process is performed, if determined that the vehicle 1 is not travelling before the predetermined storage period TM elapses from when determined that the vehicle 1 is travelling, the measurement of the storage period TM is temporarily stopped, and the measurement is resumed when determined that the vehicle 1 is travelling again. Instead, if determined that the vehicle 1 is not travelling before the predetermined storage period TM elapses from when determined that the vehicle 1 is travelling, for example, the registration mode may be terminated and the receiver 13 may be returned to the original mode. In the same manner, when the deletion process is performed, if determined that the vehicle 1 is not travelling before the predetermined deletion period TD elapses from when determined that the vehicle 1 is travelling, for example, the registration mode may be terminated and the receiver 13 may be returned to the original mode.

In each of the above embodiments, the operation mode manager 21 may keep the receiver 13 in the registration mode so that the receiver 13 is not switched to the non-registration mode even when a situation in which the number of candidate tire IDs in the volatile region 16b of the memory 16 is unequal to the predetermined storage number continues over the predetermined registration period or longer. Further, the operation mode manager 21 may keep the receiver 13 in the registration mode so that the receiver 13 is not switched to the non-registration mode even when the number of candidate IDs in the memory 16 becomes less than the predetermined storage number. The non-registration mode may be a mode the receiver 13 enters before switching to the registration mode. For example, the non-registration mode may be a specific mode such as a pressure monitoring mode.

In each of the above embodiments, the deletion unit 26 repeats the deletion process. Instead, the deletion process may be performed only once. In this case, as long as the number of candidate IDs in the memory 16 after the deletion process is performed is unequal to the predetermined storage number, the operation mode manager 21 terminates the registration mode and switches to the original mode.

In each of the above embodiments, the deletion unit 26 may be omitted from the receiver 13.

In each of the above embodiments, the predetermined storage period TM may be set as a period in which the tire pressure detector 4 transmits the tire pressure signal Stp only once. In the same manner, the predetermined deletion period TD may be set as a period in which the tire pressure detector 4 transmits the tire pressure signal Stp only once.

In each of the above embodiments, the time interval in which each tire pressure detector 4 transmits the tire pressure signal Stp when the corresponding tire 2 rotates does not have to be shorter than that when the tire 2 does not rotate. For example, the time interval when the tire 2 rotates may be equal to the time interval when the tire 2 does not rotate.

In each of the above embodiments, when a tire ID that is not stored in the volatile region 16*b* of the memory 16 exists among the tire IDs included in the tire pressure signals Stop received during the predetermined deletion period TD while the deletion unit 26 performs a deletion process, the storage manager 25 may store that tire ID in the volatile region 16*b*. In such a configuration, for example, in FIG. 3, the volatile region 16*b* of the memory 16 stores "ID13" after the first predetermined deletion period TD elapses.

In a configuration in which the storage manager 25 stores, in the volatile region 16*b*, the tire IDs included in tire pressure signals Stp received during the predetermined deletion period, among the tire IDs included in the tire pressure signals Stp received during the predetermined deletion period TD, when a tire ID that is not stored in the volatile region 16*b* is the same as a tire ID that has been deleted by the deletion unit 26, it is preferred that such an ID not be stored in the volatile region 16*b*. In such a configuration, for example, as shown in FIG. 3, after the second predetermined deletion period TD elapses, "ID19" is not stored in the volatile region 16*b* of the memory 16.

Further, in a configuration that stores, in the volatile region 16*b*, the tire IDs included in the tire pressure signals Stp that the storage manager 25 receives during the predetermined deletion period TD, when a tire ID included in a tire pressure signal Stp received during the predetermined deletion period TD is presumed to be a tire ID of another vehicle, that tire ID does not have to be stored.

In each of the above embodiments, the travel determination unit 22 determines whether or not the vehicle 1 is travelling based on the speed detection value (vehicle speed information) obtained from the meter ECU. Instead, each tire pressure detector 4 may be configured to transmit a tire pressure signal Stp that includes travel information indicating whether or not the tire 2 is rotating, and the travel determination unit 22 may determine that the vehicle 1 is travelling when receiving travel information indicating that the tire 2 is rotating.

In each of the above embodiments, in lieu of or in addition to the display 17, the announcement unit 23 may include a visual, audio, or tactile device, such as a hazard lamp, a buzzer, or a speaker, to announce the registration situation of the tire IDs.

If the registration mode is terminated before the registration unit 27 completes the registration process, the announcement unit 23 does not have to show a sign indicating that ID registration is incomplete and does not have to announce that the registration mode has been terminated in an abnormal manner. In this case, the announcement unit 23 may announce that, for example, tire pressure signals Stp including tire IDs registered in the receiver 13 cannot be temporarily received. This configuration allows the registrant to recognize that the registration mode has been terminated although the registration process is incomplete.

The input device that switches the operation mode of the receiver 13 may be changed. For example, the operation mode of the receiver 13 may be switched when the brake pedal is depressed a predetermined number of times. Further, the receiver 13 may be switched to the registration mode whenever the ignition switch is activated.

The tire pressure signal Stp may include a single frame when the corresponding tire 2 rotates. Further, the tire pressure signal Stp may include a plurality of frames when the corresponding tire 2 does not rotate.

It is preferred that a wireless signal including the tire ID be the tire pressure signal Stp. However, other wireless signals that do not include the tire pressure information may be used as long as the tire ID is included. A wireless signal that includes a tire ID may be referred to as a wireless tire ID signal.

In each of the above embodiments, the tire IDs of the tires 2*a* to 2*e* are written to and saved in the nonvolatile region 16*a* of the memory 16 irrelevant to the tire location. However, the tire IDs may be written and saved in association with the tire locations (right front, left front, right rear, left rear, and spare). In this case, when the receiver 13 determines that the tire pressure of a tire is low, it is preferred that the location of the low-pressure tire be shown on the display 17.

In each of the above embodiments, the vehicle 1 does not have to include a spare tire (tire 2*e*), and the tires 2 that are ID-registered do not have to include a spare tire.

Each of the components 21 to 23 and 25 to 29 in the receiver 13 may be a dedicated circuit. In the same manner, each of the components 12*a* and 12*b* of each tire pressure detector 4 may also be a dedicated circuit. The components 21 to 23 and 25 to 29 of the receiver 13 may be realized when a computer processor of the TPMS ECU 14 executes computer-readable instructions stored in a non-transitory computer-readable storage medium. In the same manner, the components 12*a* and 12*b* of the tire pressure detector 4 may be realized when a computer processor of the controller 6 executes computer-readable instructions stored in a non-transitory computer readable storage medium.

By way of example, and not limitation, the non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A tire identification code registration system for use with a plurality of tire pressure detectors and a tire pressure monitoring system receiver, wherein each of the tire pressure detectors includes a unique tire identification code and is configured to be coupled to a tire, each of the tire pressure detectors is configured to detect pressure of a corresponding tire and transmit a wireless signal that includes tire pressure information, and the receiver is configured to receive the wireless signal and monitor the pressure of the corresponding tire based on the received wireless signal, the tire identification code registration system comprising:
a storage manager configured to store, in a memory, tire identification codes included in wireless signals received during a predetermined storage period as candidate tire identification codes;
a registration processor configured to register the candidate tire identification codes in the memory as formal tire identification codes after the candidate tire identification codes are stored in the memory by the storage manager, when a number of candidate tire identification codes stored in the memory is equal to a predetermined storage number; and
a deletion processor that deletes a candidate identification code from the candidate identification codes stored in the memory, when the number of candidate identification codes stored in the memory is greater than the predetermined storage number, and when the candidate tire identification code is not included in a wireless signal received during a predetermined deletion period.

2. The tire identification code registration system according to claim 1, wherein
the storage manager is configured to store, in the memory, tire identification codes included in wireless signals received during a period in which a detected vehicle speed is greater than a travel determination reference value; and
the storage manager is configured not to store, in the memory, tire identification codes included in wireless signals received during a period in which the detected vehicle speed is less than or equal to the travel determination reference value.

3. The tire identification code registration system according to claim 1, wherein, when the number of candidate tire identification codes stored in the memory subsequent to the deletion is greater than the predetermined storage number, the deletion processor repeats the deletion.

4. The tire identification code registration system according to claim 1, wherein the storage manager does not store, in the memory, a tire identification code included in a wireless signal received during the predetermined deletion period.

5. The tire identification code registration system according to claim 1, wherein the predetermined deletion period has a duration in which each of the tire pressure detectors transmits the wireless signals, each including the tire identification code a plurality of times.

6. The tire identification code registration system according to claim 5, further comprising:
a transmission controller installed in each of the tire pressure detectors, wherein the transmission controller detects rotation of the corresponding tire and transmits the wireless signals more frequently when the detected tire rotation exceeds a rotation reference value; and
a duration setting processor installed in the receiver, wherein the duration setting processor changes the duration of the predetermined deletion period in accordance with a detected vehicle speed.

7. The tire identification code registration system according to claim 1, wherein the predetermined storage period has a duration in which each of the tire pressure detectors transmits the wireless signals, each including the tire identification code, a plurality of times.

8. The tire identification code registration system according to claim 7, further comprising:
a transmission controller installed in each of the tire pressure detectors, wherein the transmission controller detects rotation of the corresponding tire and transmits the wireless signals more frequently when the detected tire rotation exceeds a rotation reference value; and
a duration setting processor installed in the receiver, wherein the duration setting processor changes the duration of the predetermined storage period in accordance with a detected vehicle speed.

9. The tire identification code registration system according to claim 1, further comprising a registration termination processor installed in the receiver, wherein, when the number of candidate tire identification codes stored in the memory continues to be equal to the predetermined storage number over a predetermined storage period or longer, the registration termination processor switches an operation mode of the receiver from a tire identification code registration mode to a non-registration mode.

10. The tire identification code registration system according to claim 1, further comprising a registration termination processor installed in the receiver, wherein, when the number of the candidate tire identification codes in the memory is less than the predetermined storage number, the registration termination processor switches an operation mode of the receiver from a tire identification code registration mode to a non-registration mode.

11. The tire identification code registration system according to claim 1, wherein
the storage manager includes a presumption condition and is configured to use the presumption condition to presume that a wireless signal received during the predetermined storage period is transmitted from another vehicle, and
in the tire identification codes included in the wireless signals received during the predetermined storage period, the storage manager is configured not to store a tire identification code included in a wireless signal presumed to be transmitted from another vehicle.

12. A controller for a tire pressure monitoring system, the controller comprising:
a volatile memory;
a nonvolatile memory; and
a computer processor coupled to the volatile memory and the nonvolatile memory, the computer processor configured to:
store, in the volatile memory, a tire identification code included in each tire pressure signal received during a predetermined storage period, as a candidate tire identification code,
register, to the nonvolatile memory, the candidate tire identification code as a formal tire identification code, when a number of candidate tire identification codes stored in the volatile memory at an end of the predetermined storage period is equal to a predetermined storage number;
delete a candidate tire identification code that meets a deletion condition from the volatile memory, when if the number of candidate tire identification codes stored in the volatile memory at the end of the predetermined storage period is greater than the predetermined storage number; and
delete a candidate tire identification code from the memory, when the candidate tire identification code is not included in a tire pressure signal received during a predetermined deletion period.

13. A tire pressure monitoring system comprising:
a tire pressure detector including a unique tire identification code, wherein the tire pressure detector is coupled to a tire and configured to detect pressure of the tire and transmit a wireless signal that includes tire pressure information;
a receiver configured to receive the wireless signal and monitor the pressure of the corresponding tire based on the wireless signal; and
the controller according to claim 12, wherein the controller is installed in or coupled to the receiver.

14. A non-transitory computer-readable storage medium storing instructions that cause a computer processor to execute a tire identification code registration method, the instructions comprising:
instructions configured to store, in a volatile memory of a tire identification code registration system, a tire identification code included in each tire pressure signal received during a predetermined storage period as a candidate tire identification code;
instructions configured to register, to a nonvolatile memory of the tire identification code registration system, each candidate tire identification code in the volatile memory as a formal tire identification code, when a number of candidate tire identification codes stored in the volatile memory at an end of the predetermined storage period is equal to a predetermined storage number; and
instructions configured to delete, from the volatile memory, a candidate tire identification code that meets a deletion condition, when the number of candidate tire identification codes stored in the volatile memory at the end of the predetermined storage period is greater than the predetermined storage number; and
instructions configured to delete a candidate tire identification code from the volatile memory, when the candidate tire identification code is not included in a tire pressure signal received during a predetermined deletion period.

\* \* \* \* \*